United States Patent
Allen et al.

(10) Patent No.: US 10,346,569 B2
(45) Date of Patent: Jul. 9, 2019

(54) MULTI-SIDED VARIATIONS FOR CREATING INTEGRATED CIRCUITS

(71) Applicant: International Business Machines Corporation, Armonk, NY (US)

(72) Inventors: Robert J. Allen, Jericho, VT (US); Nathan C. Buck, Underhill, VT (US); Eric A. Foreman, Fairfax, VT (US); Jeffrey G. Hemmett, St. George, VT (US); Kerim Kalafala, Rhinebeck, NY (US); Gregory M. Schaeffer, Poughkeepsie, NY (US); Stephen G. Shuma, Underhill, VT (US); Debjit Sinha, Wappingers Falls, NY (US); Natesan Venkateswaran, Hopewell Junction, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/851,815

(22) Filed: Dec. 22, 2017

(65) Prior Publication Data
US 2018/0239860 A1      Aug. 23, 2018

Related U.S. Application Data

(63) Continuation of application No. 15/436,895, filed on Feb. 20, 2017.

(51) Int. Cl.
*G06F 17/50*      (2006.01)

(52) U.S. Cl.
CPC ........ *G06F 17/5031* (2013.01); *G06F 17/505* (2013.01); *G06F 17/5022* (2013.01); *G06F 17/5063* (2013.01); *G06F 2217/84* (2013.01)

(58) Field of Classification Search
CPC .................................................. G06F 17/5081
(Continued)

(56) References Cited

U.S. PATENT DOCUMENTS

| 7,293,248 B2 | 11/2007 | Chang et al. |
| 7,474,999 B2 | 1/2009 | Scheffer |

(Continued)

OTHER PUBLICATIONS

Onaissi et al.,"A Linear-time Approach for Static Timing Analysis Covering All Process Corners", Nov. 2006, Proceedings of the 2006 IEEE/ACM International Conference on Computer-aided design, pp. 217-224.*

(Continued)

*Primary Examiner* — Sun J Lin
(74) *Attorney, Agent, or Firm* — Christopher K. McLane

(57) ABSTRACT

Creating by a computer an integrated circuit with non-linear variations, the computer identifies an integrated circuit design; identifies a timing model associated with the identified integrated circuit design; defines one or more static single sided variables; defines one or more regions of the defined one or more static single sided variables that are treated linearly; defines one or more multi-sided variables based on the defined one or more regions of the defined one or more static single sided variables; identifies one or more timing paths within the identified integrated circuit design; performs a statistical static timing analysis on the identified timing model for the identified one or more timing paths within the identified integrated circuit design utilizing the defined one or more multi-sided variables; provides one or more timing quantities that project within a multi-parameter space based on the performed statistical static timing analysis.

1 Claim, 6 Drawing Sheets

(58) Field of Classification Search
USPC .......................................... 716/100, 110, 113
See application file for complete search history.

(56) References Cited

U.S. PATENT DOCUMENTS

| | | | |
|---|---|---|---|
| 7,487,475 | B1 | 2/2009 | Kriplani et al. |
| 7,984,406 | B2 | 7/2011 | Akamine et al. |
| 8,132,139 | B2 | 3/2012 | Asai |
| 8,141,012 | B2 | 3/2012 | Buck et al. |
| 8,161,443 | B2 | 4/2012 | Asai |
| 8,341,572 | B1 | 12/2012 | Tiwary et al. |
| 8,407,640 | B2 | 3/2013 | Le et al. |
| 8,418,107 | B2 | 4/2013 | Hemmett et al. |
| 8,615,727 | B2 | 12/2013 | Ghanta et al. |
| 8,843,864 | B2 | 9/2014 | Le et al. |
| 8,856,709 | B2 | 10/2014 | Foreman et al. |
| 8,924,906 | B2 | 12/2014 | Oh et al. |
| 9,129,078 | B1 | 9/2015 | Keller et al. |
| 2008/0201676 | A1 | 8/2008 | Chang et al. |
| 2010/0287517 | A1 | 11/2010 | Buss et al. |
| 2016/0203251 | A1 | 7/2016 | Sunder et al. |
| 2016/0283640 | A1 | 9/2016 | Foreman et al. |
| 2018/0060471 | A1 | 3/2018 | Foreman et al. |
| 2018/0239858 | A1* | 8/2018 | Allen et al. ......... G06F 17/5081 |
| 2018/0239859 | A1* | 8/2018 | Allen et al. ......... G06F 17/5081 |
| 2018/0239860 | A1* | 8/2018 | Allen et al. ......... G06F 17/5081 |

OTHER PUBLICATIONS

Feng et al., "A Methodology for Timing Model Characterization for Statistical Static Timing Analysis", Nov. 2007, Proceedings of the 2007 IEEE/ACM International onference on Cpmputer-aided Design, pp. 725-729.*

Veetil et al., "Criticality Aware Latin Hypercube Sampling for Efficient Statistical Timing Analysis", EECS Department, University of Michigan, Ann Arbor, MI—48109, printed on Nov. 10, 2016, 7 pages.

Allen et al., "Multi-Sided Variations for Creating Integrated Circuits", U.S. Appl. No. 15/436,895, filed Feb. 20, 2017, 44 pages.

Allen et al., "Multi-Sided Variations for Creating Integrated Circuits", U.S. Appl. No. 15/822,513, filed Nov. 27, 2017, 39 pages.

Appendix P, List of IBM Patents or Patent Applications Treated as Related, 2 pages, dated Jan. 11, 2018.

* cited by examiner

MULTI-SIDED VARIATIONS FOR CREATING INTEGRATED CIRCUITS

BACKGROUND

The present invention relates generally to the field of statistical static timing analysis, and more particularly to performing multi-sided variations that result in timing quantities, in which the timing quantities enable projection to a specified process/voltage point within a parameter space.

An integrated circuit (also known as a microcircuit, a microchip, a silicon chip, or a chip) is a miniaturized electronic circuit consisting of mainly semiconductor devices and passive components, manufactured in a surface of a thin substrate of semiconductor material. The integrated circuit is constructed from small electronic circuits called logic gates (i.e., an idealized or physical device implementing a Boolean function that performs a logical operation on one or more logical inputs) that produces a single logical output resulting in an electrical flow or voltage, which can control more logic gates. Operation of the integrated circuit is characterized by a clock frequency (e.g., clock signal). The clock signal oscillates between a high and a low state to coordinate actions of integrated circuits. The logic gates can control the clock signal to effectively enable or disable a portion of the integrated circuit. To gauge the ability of the integrated circuit to operate at a specified speed, measurements of the delays are taken throughout the design process.

Delay calculation, calculates the gate delay (i.e., a length of time between when the input to a logic gate becomes stable and valid to change to the time that the output of that logic gate is stable and valid to change) of a single logic gate (i.e.,) and the delay created by the attached wires. Calculation of the gate delay may be provided by circuit simulators, two dimensional tables (e.g., logic synthesis), placement and routing (i.e., tables take an output load and input slope, and generate a circuit delay and output slope), and K factor models (i.e., approximates the delay as a constant plus k times the load capacitance). Calculation of the wire delay may be provided by a lumped C (i.e., entire wire capacitance is applied to the gate output, and the delay through the wire itself is ignored), an Elmore delay (i.e., delay of each wire segment is an electrical resistance (R) of that segment times the electrical capacitance (downstream C), moment matching (i.e., matches multiple moments in the time domain, or finds a good rational approximation in the frequency domain), and circuit simulators.

Static timing analysis (STA) is an input-independent method of analyzing a frequency or a clock rate (e.g., validating the timing performance) for an integrated circuit by simulating the delays of entire paths of an integrated circuit without requiring a simulation of the full integrated circuit. STA breaks down the design of the integrated circuit into a set of timing paths, calculates the signal propagation delay along each path (i.e., time required for a digital signal to travel from the input of a logic gate to the output), and checks for violations of timing constraints. Two kinds of violations (e.g., timing errors) are possible: a setup time violation and a hold time violation. A setup time violation is based on a setup constraint that specifies an amount of time that is necessary for data to be available (e.g., stable) at the input of a sequential device before the clock edge that the input signal needs to guarantee the input signal is properly accepted on the clock edge that captures the data in the device. The hold time violation is based on a hold constraint that specifies how much time is necessary for data to be stable at the input of a sequential device after receiving the clock edge (i.e., the hold constraint enforces a minimum delay on the data path relative to the clock path).

Statistical static timing analysis (SSTA) is an alternative to STA. SSTA replaces fixed or normal deterministic timing of gates and interconnects with probability distributions (e.g., a range of probabilities), thereby returning a distribution of possible circuit outcomes rather than a single outcome. SSTA employs a sensitivity based approach to model the effect of variations on timing by determining how a change in a particular device or interconnect parameter (e.g., oxide, wire thickness, etc.) affects a desired property (e.g., slew, capacitance, etc.). The sensitivity to the parameter in conjunction with the probability distribution (i.e., mean and standard deviation) provides a statistical model describing the probability that a parameter will have a certain effect on a device or interconnect property. SSTA uses sensitivities to identify correlations among delays, and utilizes the correlations when computing how to add statistical distributions of delays (i.e., model the effect on timing). The SSTA maps the standard deviations with respect to the devices and interconnect parameters to obtain an overall standard deviation of the path delay. SSTA includes a path-based method and a block based method. The path based method sums gate and wire delays on specific paths. The block-based method generates the arrival times and required times for each node, working both forward and backward from the clocked elements.

SUMMARY

Aspects of the present invention disclose a method, computer program product, and system for creating an integrated circuit with non-linear variations, the method comprises computer processors identifying an integrated circuit design. The method further comprises computer processors identifying a timing model associated with the identified integrated circuit design. The method further comprises the computer processors defining one or more static single sided variables. The method further comprises the computer processors defining one or more regions of one or more of the defined one or more static single sided variables that are treated linearly. The method further comprises the computer processors defining one or more multi-sided variables based on the defined one or more regions of the one or more of the defined one or more static single sided variables. The method further comprises the computer processors identifying one or more timing paths within the identified integrated circuit design. The method further comprises the computer processors performing a statistical static timing analysis on the identified timing model for the identified one or more timing paths within the identified integrated circuit design utilizing the defined one or more multi-sided variables. The method further comprises the computer processors providing one or more timing quantities that project within a multi-parameter space based on the performed statistical static timing analysis.

DETAILED DESCRIPTION

Very-large-scale integration (VLSI) is a process of creating an integrated circuit (IC) by combining thousands of transistors into a single chip (i.e., a single small plate of semiconductor material). Embodiments of the present invention recognize that during timing closure, covering a multiple parameter space is necessary. Timing closure is the process by which a VLSI design is modified to meet timing requirements through layout optimizations and modifications to a netlist (i.e., describes connectivity of an electronic circuit) during the physical design portion of an integrated circuit. Embodiments of the present invention recognize that the timing closure can be done by performing multi-corner timing with margins, however the results are pessimistic (i.e., worst case timing margins in which the timing margins tend to be greater than actual timing margins present in reality, resulting in loss of accuracy) and include a high number of input/output (I/O) files for review, which is time consuming. Additionally, embodiments of the present invention recognize that a statistical static timing analysis (SSTA) can cover a larger process space within a single timing run and with pessimism reduction techniques (e.g., logical correlation, timing window correlation, coupling aware static timers, etc.). However, covering a larger process space requires complex non-linear, non-separable models to maintain accuracy at corners. Embodiments of the present invention recognize that by utilizing complex statistical models run-time and memory consumption increase which is expensive.

Embodiments of the present invention improve modeling accuracy at corners within a large multiple parameter process space for timing closure. For embodiments of the present invention, process parameters can include manufacturing process variation, environment variation such as voltage or temperature, and aging variation such as end of life. Embodiments of the present invention divide the process space for at least one parameter into regions that can be modeled linearly with reasonable accuracy as quantified by a study of the linearity/non-linearity of process variables within small circuits. Embodiments of the present invention utilize a statistical timer to propagate a model for each region that results from the division of the process space. In some embodiments of the present invention, interior points within the process space are additional corners from which the present invention performs projections, and at which the present invention can model timing accurately. By projecting from the interior points, embodiments of the present invention create multi-sided sensitivities; thereby allowing for projections to occur at multiple points within the process space with a higher degree of accuracy (e.g., less pessimistic) and with minimal amount of delay library requirements.

Figure 1:
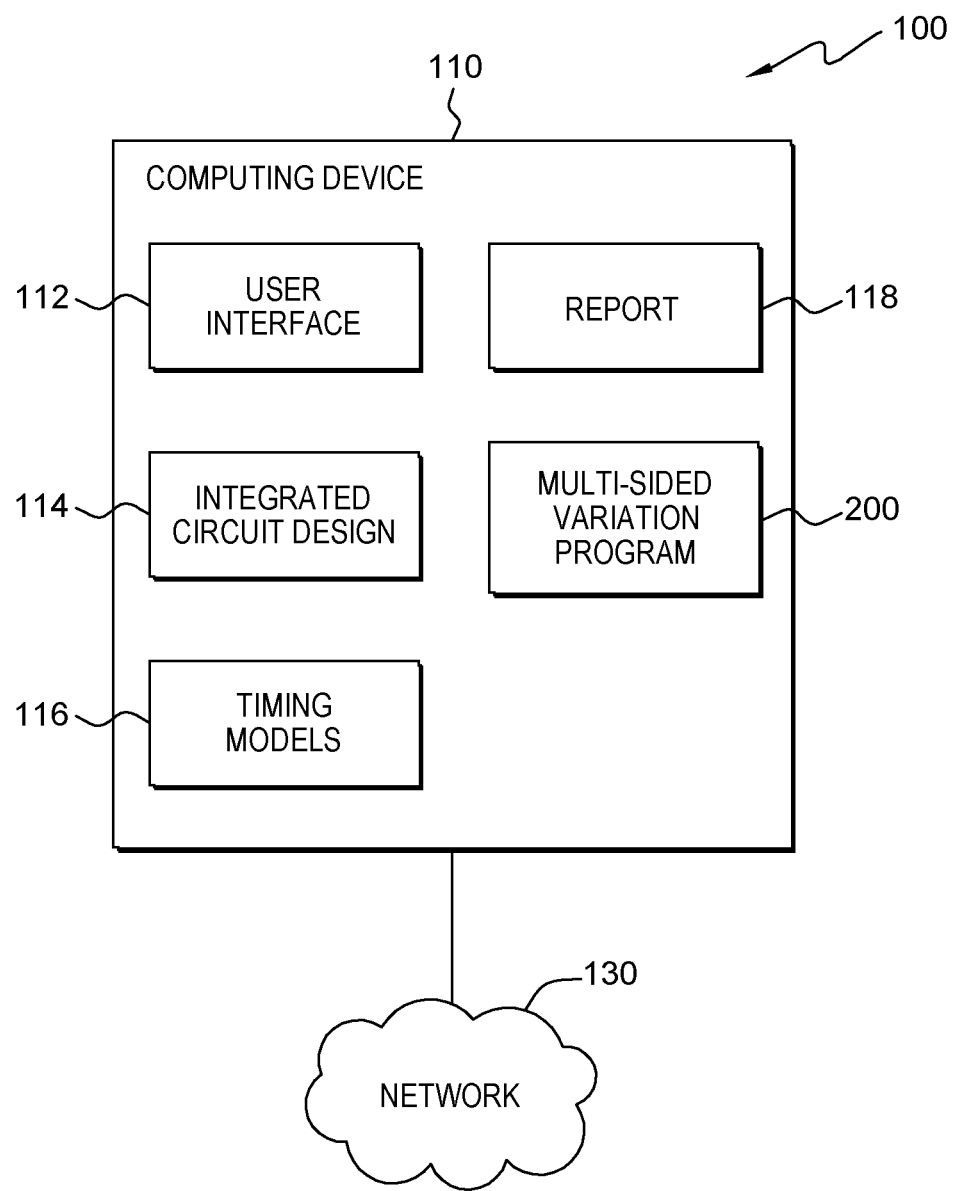
FIG. 1 is a functional block diagram illustrating a statistical static timing analysis environment, in accordance with an embodiment of the present invention.

The present invention will now be described in detail with reference to the Figures. FIG. 1 is a functional block diagram illustrating a statistical static timing analysis environment, generally designated 100, in accordance with one embodiment of the present invention. FIG. 1 provides only an illustration of one embodiment and does not imply any limitations with regard to the environments in which different embodiments may be implemented.

In the depicted embodiment, statistical static timing analysis environment 100 includes computing device 110 and network 130. Statistical static timing analysis environment 100 may include additional computing devices, mobile computing devices, servers, computers, storage devices, networks, or other devices not shown.

Computing device 110 may be a web server or any other electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating over network 130. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. Computing device 110 contains user interface 112, integrated circuit design 114, timing models 116, report 118, and multi-sided variation program 200.

User interface 112 is a program that provides an interface between a user of computing device 110 and a plurality of applications that reside on computing device 110 (e.g., multi-sided variation program 200). A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to multi-sided variation program 200.

Integrated circuit design 114 is the schematic or physical design for the construction of an integrated circuit that identifies electronic components (e.g., transistors, resistors, capacitors, wires, logic gates, etc.), a metallic interconnect material, electrical connections, and placement of the electronic components on a piece of semiconductor to create a chip. Creation of integrated circuit design 114 follows an integrated circuit design process that includes: a micro-architecture and system level design (i.e., defines functionality of the integrated circuit and specifications), a register-transfer level (RTL) design (i.e., behavioral model of actual operational functionality), and the physical design (i.e., maps the RTL design into an actual geometric representations of all electronics devices). The physical design includes: logic synthesis, floor planning, placement, logic/placement refinement, clock insertion, routing, post wiring optimization, design for manufacturability, final error checking, and tapeout. Design closure occurs during post wiring optimization, in which violations to performance (i.e., timing closure), noise (i.e., signal integrity), and yield (i.e., design for manufacturability) are removed. In an exemplary embodiment, multi-sided variation program 200 initiates within system level design during physical design. During the physical design, circuit representations of the components (e.g., devices and interconnects) of integrated circuit design 114 are converted into geometric representations of shapes that when manufactured in the corresponding layers of materials, ensure required functioning of the components. The physical design is split into several sub-steps including both design and verification and validation of the layout (e.g., partitioning, floor planning, placement, clock tree synthesis, signal routing, and timing closure). In another embodiment, multi-sided variation program 200 initiates at any point during the creation of integrated circuit design 114, in which at least an initial instance of integrated circuit design 114 is available. In the depicted embodiment, integrated circuit design 114 resides on computing device 110. In another embodiment, integrated circuit design 114 may reside on a server or another computing device (not shown) connected to network 130 provided integrated circuit design 114 is available to multi-sided variation program 200.

Timing models 116 is a library file that identifies delay models (i.e., timing response model) for the electrical components (e.g., inverter, AND gate, OR gate, etc.) of integrated circuit design 114. The delay (e.g., timing response) is the time that passed while a data signal propagates from a starting point to an ending point through a timing path within integrated circuit design 114. Timing models 116 includes a table with the delays that provides a slew rate/load and process/voltage/temperature condition for inputs and outputs of the electrical component in a particular semiconductor technology. The slew rate is a rate of change of voltage per unit of time measured in volts/second and may specify minimum or maximum limits on for inputs and/or outputs, with the limits only valid for a set of provided conditions (e.g., output loading). For an output, the slew rate guarantees that the speed of the output signal transition will be at least a given minimum, or at most the given maximum. For an input, the slew rate indicates that the external driving circuitry needs to meet specified limits in order to guarantee correct operation of a receiving device. Process conditions identify deviations in the semiconductor fabrication process, measured as a percentage variation in a performance calculation, such as variations to impurity concentration densities, oxide thicknesses, and diffusion depths.

Voltage conditions can vary from established ideal value during day-to-day operation, thus changing the delay. For example, a higher voltage reduces the delay (e.g., increases speed), whereas a lower voltage increases the delay (e.g., decreases speed) of integrated circuit design 114. Temperature conditions vary during operation of the chip due to power dissipation (i.e., rate of energy transfer), in which power is converted to heat, thereby increasing a surrounding temperature, which causes an increase in the delay. Each process/voltage/temperature condition within timing models 116 defines a process corner, which specifies the delay of the gates at that process/voltage/temperature condition. The process corner represents a sigma variation (i.e., standard deviation) from nominal doping concentrations to electrical components on the chip (e.g., silicon wafer, slice, semiconductor material, etc.), which changes a duty cycle and slew rate. In the depicted embodiment, timing models 116 resides on computing device 110. In another embodiment, timing models 116 may reside on a server or another computing device (not shown) connected to network 130 provided timing models 116 is available to multi-sided variation program 200.

Report 118 is the output results of multi-sided variation program 200. In one embodiment, report 118 is a test report detailing the analysis of integrated circuit design 114 by multi-sided variation program 200. Report 118 reports the multi-sided sensitivities for non-linear delays as calculated by multi-sided variation program 200. Additionally in some embodiments, report 118 includes multi-sided variations that occur during propagation and maximum operation. In some other embodiments, report 118 may include graphs that depict the projection to additional points within the process space from interior points. In yet some other embodiments, report 118 includes multi-sided variations for multiple types of corner schemes such as a star type scheme (i.e., utilizes a single base corner for both voltage (V) and process (P) variations, z type scheme (i.e., a single base corner for V and two separate corners for P variations) s type scheme, etc., that result in different high and low accuracy corners.

In addition, report 118 may include additional information pertaining to the critical path, arrival time, required time, slack, and verification of proper circuit performance with respect to the nominal voltage and frequency and over the given voltage range for a time period and/or varying time periods (e.g., time to complete the waveform cycle). The critical path defines the path between an input and output with the maximum delay. The arrival time is the time elapsed for a signal to arrive at a certain point. The required time is the latest time at which a signal can arrive without making the clock cycle longer than desired. Slack is the difference between the required time and the arrival time between gates within integrated circuit design 114. Positive slack implies that the arrival time at a node may be increased without affecting the overall delay of the circuit. Conversely, negative slack implies that a path is too slow, and the path must be sped up or incorporate a delay of the reference signal in order for the whole circuit to work at the desired speed. In yet some other embodiments, report 118, includes one or more of the aforementioned output results (e.g., combination of detailed analysis, multi-sided variations during propagation and maximum operation, multi-sided variations for multiple types of corner schemes, graphs, etc.). In the depicted embodiment, report 118 resides on computing device 110. In another embodiment, report 118 may reside on a server or another computing device (not shown) connected to network 130 provided multi-sided variation program 200 is able to access the server or the another computing device (not shown) over network 130.

In an exemplary embodiment, multi-sided variation program 200 is a program for determining multi-sided variations for non-linear delays for projection within a process space associated with integrated circuit design 114. Multi-sided variation program 200 utilizes a statistical static timing analysis (SSTA) for timing models 116 to calculate multi-sided sensitivities for integrated circuit design 114 within a single SSTA timing run. Multi-sided variation program 200 utilizes interior points within the process space as corners. Multi-sided variation program 200 performs projections from the interior points and creates multi-sided sensitivities. By utilizing the multi-sided sensitivities, multi-sided variation program 200 performs projections at multiple points with a high degree of accuracy within the process space. As multi-sided variation program 200 utilizes an exact point to calculate sensitivity, the sensitivity is equivalent to performing independent timing at the exact points. In the depicted embodiment, multi-sided variation program 200 resides on computing device 110. In another embodiment, multi-sided variation program 200 may reside on a server or another computing device (not shown) connected to network 130 provided multi-sided variation program 200 is able to access integrated circuit design 114 and timing models 116.

Figure 2:
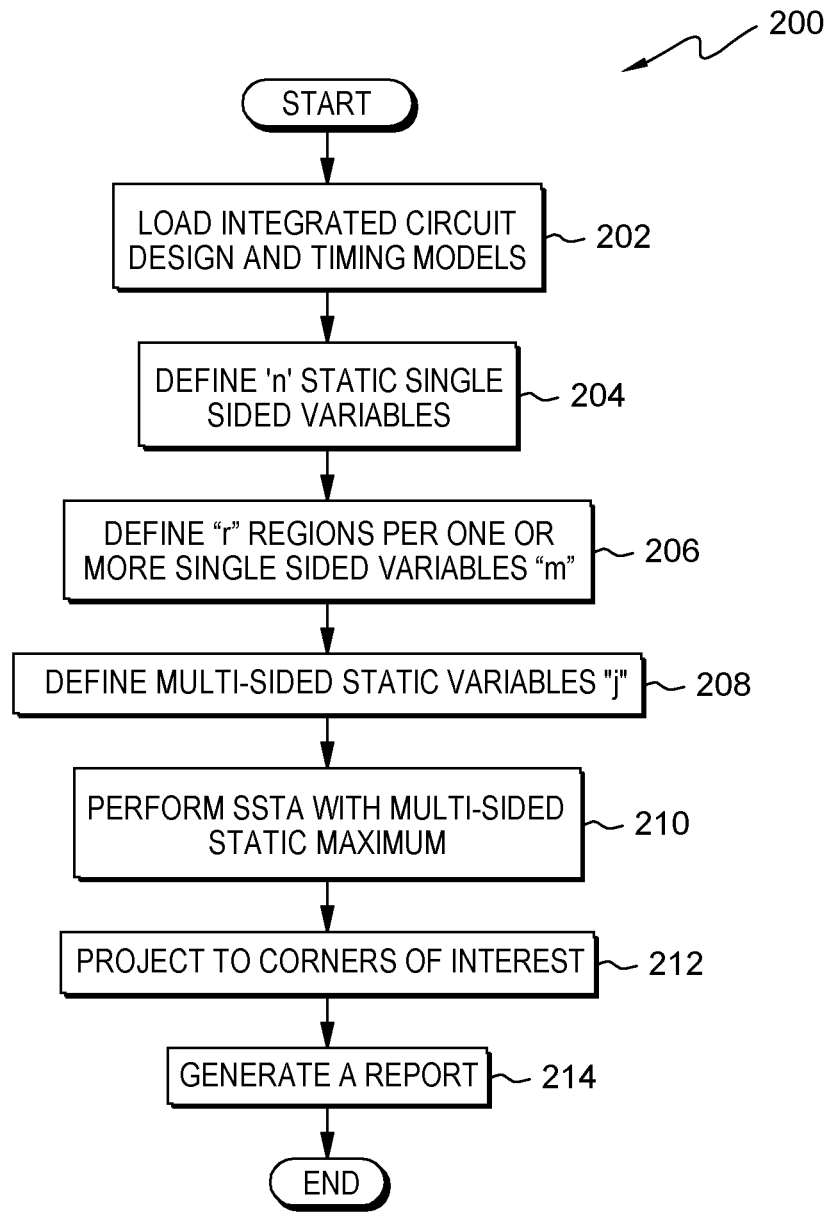
FIG. 2 is a flowchart depicting operational steps of a multi-sided variation program, on a computing device within the statistical static timing analysis environment of FIG. 1, for projecting a non-linear process space within a single statistical static timing analysis (SSTA) timing run through multi-sided variation, in accordance with an embodiment of the present invention.

FIG. 2 is a flowchart depicting operational steps of multi-sided variation program 200, a program for projecting a non-linear process space within a single statistical static timing analysis (SSTA) timing run through multi-sided variation, in accordance with an embodiment of the present invention. In one embodiment, multi-sided variation program 200 is a standalone program. In another embodiment, multi-sided variation program 200 is incorporated within another program as a selectable option and/or automatic test feature within a circuit modeling simulation program. In one embodiment prior to initiating, at least a preliminary instance of integrated circuit design 114 is available that includes an overall configuration with a current layout of the circuit, planned materials, power constraints, input/output values, etc. to meet functional requirements. For example, integrated circuit design 114 is a preliminary design, an intermediate design, or a final design prior to design closure (i.e., process in which integrated circuit design 114 is modified to meet timing requirements, design constraints, and design objectives). In another embodiment, prior to initiating, a modified and/or finalized instance of integrated circuit design 114 is available for selection in order to verify objectives after incorporating modifications to an initial instance of integrated circuit design 114. In one embodiment, multi-sided variation program 200 initiates automatically as a part of testing performed on integrated circuit design 114. For example, multi-sided variation program 200 takes place during physical design in which circuit representations of the components (i.e., devices and interconnects) of integrated circuit design 114 are converted into geometric representations of shapes which, when manufactured in the corresponding layers of materials, ensure the required functioning of the components. Within the physical design, timing closure modifies integrated circuit design 114 in order to meet timing requirements that ensure the required functioning of the components. In another embodiment, multi-sided variation program 200 initiates upon selection by a user through user interface 112 to analyze integrated circuit design 114. Multi-sided variation program 200 initiates upon receipt (e.g., identification) of integrated circuit design 114 and timing models 116 for test (step 202).

In step 202, multi-sided variation program 200 loads integrated circuit design 114 and timing models 116. In one embodiment, multi-sided variation program 200 receives a selection of integrated circuit design 114 and timing models 116 from a script (i.e., macro or batch file of a list of commands that can be executed without interaction from a user) that identifies integrated circuit design 114 and timing models 116 for test. For example, multi-sided variation program 200 runs (e.g., performs, executes) the script file, which identifies a file name and storage location within memory for integrated circuit design 114 and timing models 116 to multi-sided variation program 200. Multi-sided variation program 200 retrieves and loads the identified integrated circuit design 114 and timing models 116 based on the information within the script file. In another embodiment, multi-sided variation program 200 receives a selection of integrated circuit design 114 and timing models 116 from a user via user interface 112. For example the user via user interface 112 identifies integrated circuit design 114 and timing models 116 via a pull down menu selections, an open file command, a load file command, in response to prompts to select files for test, etc. Multi-sided variation program 200 loads integrated circuit design 114 and timing models 116 as identified by the user selections received via user interface 112.

In step 204, multi-sided variation program 200 defines "n" static single sided variables. A static single sided variable refers to a traditional static variable that is either finite-differenced or asserted (i.e., a user defined value or a fractional amount of the mean). Finite differencing solves differential equations (i.e., functions that represent physical quantities) by approximating the functions with difference equations that define a relationship. The finite differences approximate the derivatives that represent a rate of change by measuring the sensitivity to change of the quantity. For example, a single sided temperature variable has two values, a high temperature and a low temperature, and can occur at either of the two temperatures. However, a single sensitivity represents the temperature change between the high temperature and the low temperature. In an embodiment, the number "n" defines the number of process parameters which multi-sided variation program 200 considers when performing a timing analysis of integrated circuit design 114 multi-sided sensitivities and performs projections.

In one embodiment, multi-sided variation program 200 identifies the number "n" based on design parameters associated with integrated circuit design 114. A design parameter identifies operating conditions in which integrated circuit design 114 operates correctly. For example, design parameters include process parameters (e.g., set limits that identify acceptable fabrication parameter variations, nominal process), temperature (e.g., minimum and maximum temperatures that define the temperature range in which integrated circuit design 114 operates, nominal temperature), and voltage (e.g., minimum and maximum voltages that define the voltage range in which integrated circuit design 114 operates, nominal voltage, etc.). In another embodiment, multi-sided variation program 200 identifies "n" static single sided variables based on input from a user via user interface 112. In one embodiment, multi-sided variation program 200 defines the static single sided variables as interior points within the design parameters of integrated circuit design 114. In another embodiment multi-sided variation program 200 defines the static single sided variables as limits (e.g., boundary conditions) of integrated circuit design based on design parameters (i.e., maximum and minimum parameters in which integrated circuit design 114 operates correctly). In another embodiment, multi-sided variation program 200 defines static single sided variables as a combination of interior points, minimums, and/or maximums from which the projections may provide additional information pertaining to preferred operating conditions of integrated circuit design 114. Multi-sided variation program 200 stores the static single sided variables for further use.

In step 206, multi-sided variation program 200 defines "r" regions per one or more static single-sided variables "m." The number "r" defines a number of regions within the process space for a specific variation input (e.g., voltage). In one embodiment, multi-sided variation program 200 divides the process space into the number of "r" regions for one or more static single-sided variables based on inclusion of an available reasonably accurate statistical model (i.e., define regions of the multi-sided variable that can be treated linearly). Multi-sided variation program 200 determines reasonable accuracy of a statistical model based on a study of the linearity and/or non-linearity of process variables within small circuits. Linear functions when graphed are depicted by a straight line in which the rate of change or slope (e.g., gradient), is the ratio of the vertical change to the horizontal change between any two distinct points on the straight line (e.g., ratio remains fixed). Non-linear functions, when graphed are depicted by a curve, in which the rate of change varies along the curve. In one embodiment, multi-sided variation program 200 models a curve associated with integrated circuit design 114 via a Taylor series to account for the voltage (e.g., single sided variable). Multi-sided variation program 200 breaks the curve into separate linear regions. Within each individual separate linear regions, multi-sided variation program 200 identifies a single sensitivity based on the slope of the line via linear projection.

Figure 3:
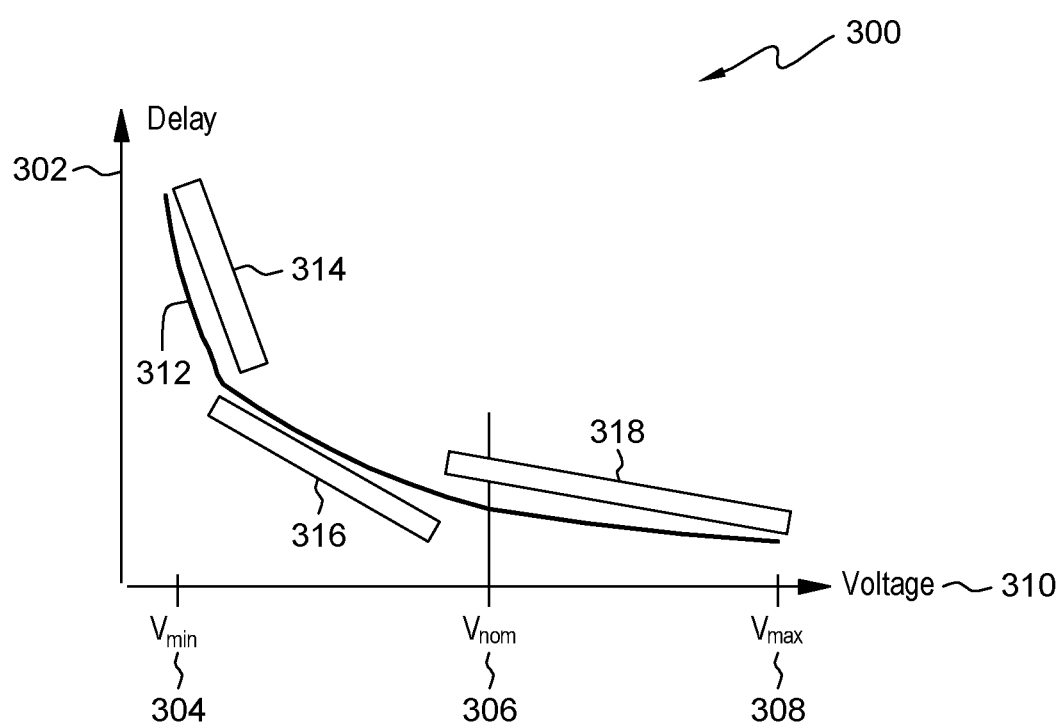
FIG. 3 is a an example of a three sided variation defining "r" regions of linearity based on a non-linear curve, in accordance with an embodiment of the present invention.

For example, FIG. 3 depicts non-linear voltage/delay relationship 300 for a process parameter of interest of integrated circuit design 114 as curve 312. The slope (e.g., rate of change) of curve 312 changes rapidly within delay 302 as small increments to voltage occur within voltage 310, while increasing from $V_{min}$ 304 to $V_{nom}$ 306 (e.g., slope decreases with a large change in the y-axis value and a small change to the x-axis value). Between $V_{min}$ 304 and $V_{nom}$ 306, as the voltage continues to increase and approaches $V_{nom}$ 306, the slope of curve 312 reduces (e.g., begins to flatten) within delay 302 (e.g., changes in the y-axis value appear proportional to changes in the x-axis value, and both the x and y axis values change similarly.) As the voltage increases from $V_{nom}$ 306 to $V_{max}$ 308 the slope of curve 312 continues to flatten (i.e., curve 312 approaches a slope of zero), in which the value of delay 302 changes minimally while the value of the voltage within voltage 310 increases (e.g., large changes in voltage result in minimal changes to the delay value). Multi-sided variation program 200 applies linear statistical models to curve 312. Based on the applied linear statistical models, multi-sided variation program 200 identifies the number of "r" regions within curve 312 that can be characterized as a straight line. Multi-sided variation program 200 identifies three regions "r" within curve 312, as region 314, region 316, and region 318.

In step 208, multi-sided variation program 200 defines multi-sided static variables "j". Multi-sided static variable "j" corresponds to the "m" single sided variables which multi-sided variation program 200 divided into "r" regions (step 206). A multi-sided static variable is a variable in which the canonical form includes a positive variation term and negative variation term that are mutually exclusive (i.e., positive and negative variations do not occur simultaneously). To achieve high accuracy, multi-sided variation program 200 utilizes multi-sided static variables "j" to model multiple points within the parameter space. Multi-sided variation program 200 asserts sensitivities to both the positive variation term and the negative variation term at the same time (e.g., splits a single parameter into multi-side variables within the region). In one embodiment, multi-sided variation program 200 estimates asserted values via a characterization of library cells for a required range of loads (i.e., electrical components of integrated circuit design 114 that consume power and affect the performance of integrated circuit design 114 with respect to output voltages or currents) and input signal slews (i.e., change of voltage per unit of time that specifies maximum or minimum for inputs or outputs). The input slew rate indicates the limit that the external driving circuitry of integrated circuit design 114 meets in order to guarantee correct operation in the receiving device. In another embodiment, multi-sided variation program 200 calculates a best approximation for the asserted values via regression analysis. Multi-sided variation program 200 stores the multi-sided static variable for further use.

In some embodiments, multi-sided variation program 200 also identifies single sided variables that are not transformed to a multi-sided variable. In one embodiment, multi-sided variation program 200 identifies a single sided variable that is relatively linear across the parameter range. As the single sided parameter is relatively linear, multi-sided variation program 200 stores the single sided variable for further analysis as part of the SSTA (e.g., reduces complexity). In another embodiment, multi-sided variation program 200 determines that modeling of interior points is not necessary for the single sided variable, and multi-sided variation program 200 determines that modeling of the boundary points provides the high accuracy, and therefore, does not necessitate transforming the single sided variable.

In step 210, multi-sided variation program 200 performs statistical static timing analysis (SSTA) with a multi-sided static maximum. In one embodiment, multi-sided variation program 200 performs the SSTA on timing models 116 associated with integrated circuit design 114, utilizing the multi-sided variables. In another embodiment, multi-sided variation program 200 performs the SSTA on timing models 116 associated with integrated circuit design 114, utilizing the multi-sided variables and remaining single-sided variables (i.e., single sided variables that are not transformed to multi-sided variables). Multi-sided variation program 200 identifies timing paths within integrated circuit design 114. Each identified timing path has a start point (i.e., input port of integrated circuit design 114) and an end point (e.g., output port of integrated circuit design 114) that varies with the type of timing path. For example, for a data path, the start point identifies a place in integrated circuit design 114 that launches the data by a clock edge and the end point identifies the location the data is captured by another clock edge. The timing path encompasses the combinational logic as data propagates through the timing path from the starting point to the end point. Multi-sided variation program 200 identifies a delay with respect to integrated circuit design 114 based on timing models 116. Multi-sided variation program 200 retrieves the delay via a look-up delay table within timing models 116 that identifies gate types with a slew/load and process/voltage/temperature (PVT) condition. Process, voltage, and temperature conditions are parameter variations that may result in delay violations or timing emergencies within integrated circuit design 114. Process variations occur due to manufacturing and process imperfections that cause slight differences in a delay and power profile for each component of a manufactured circuit. Voltage variations occur due to large current switches that result in supply voltage fluctuations through a power delivery network. Temperature variations occurs as a result of imbalanced power consumption within a chip, which leads to different intra- or inter-core temperature. Multi-sided variation program 200 calculates the delay for each timing path as a summation of all of the delays associated with the gates within each individual timing path.

Multi-sided variation program 200 performs multi-sided variation finite difference operations for integrated circuit design 114 with respect to timing models 116 and the process corners (e.g., TT, FF, and SS) along the paths. For example, for a specific gate, multi-sided variation program 200 calculates the delay at two voltage points (e.g., two deviation corners). Multi-sided variation program 200 divides the difference of the delay values by the difference of the voltages of the standard deviation points (i.e., sigma values), thus normalizing the voltage sensitivity per unit sigma. For example, $a_{V1}=(D(V_{nom})-D(V_{min}))/(V_{nom}-V_{min})$ and $a_{V2}=(D(V_{nom})-D(V_{max}))/(V_{nom}-V_{max})$. Multi-sided variation program 200 utilizes the finite difference result to project the voltage sensitivity to additional voltage values.

Multi-sided variation program 200 utilizes the sensitivity based approach of SSTA to model the effect of variations on timing for the paths of integrated circuit design 114 with a single source of variation (i.e., delay). Multi-sided variation program 200 calculates the signal propagation delay along each path for a voltage (e.g., $V_{min}$, $V_{max}$, $V_{nom}$, etc.) by replacing fixed or normal deterministic timing of gates and interconnects with probability distributions (e.g., a range of probabilities), thereby returning a distribution of possible outcomes rather than a single outcome. Through SSTA multi-sided variation program 200 generates canonical forms of the timing quantities. The canonical forms (e.g., a vector representing a timing quantity such as a delay) include a mean value and sensitivities to the source of variation.

For example, in an embodiment with a two sided variation the canonical forms includes both a multi-sided variation (e.g., multi-sided variable) and a single sided variation (e.g., single sided variable). The multi-sided variables in canonical form result in a two sided variation that identifies both a positive variation term and negative variation term in which the positive and negative variation are mutually exclusive. The delay for a path of integrated circuit design 114 is equal to $a_0+a_{V1}\Delta V_1+a_{V2}\Delta V_{2+}a_{P1}\Delta P_1+a_{P2}\Delta P_{2+}a_T\Delta T$, and depends on the voltage non-linearly. Multi-sided variation program 200 improves the accuracy of the statistical timing by utilizing different sensitivities as the voltage increases from $V_{nom}$ to $V_{max}$ and decreases from $V_{nom}$ to $V_{min}$. Multi-sided variation program 200 calculates the sensitivities by performing finite differencing from the base corner (e.g., $V_{nom}$.) to each individual identified corner (e.g., $V_{max}$, $V_{min}$). Multi-sided variation program 200 models (e.g., calculates) the exact voltage at the three points of $V_{min}$, $V_{nom}$, and $V_{max}$. As an exact sensitivity for each point on the curve is known, multi-sided variation program 200 connects each of the three points via straight lines (e.g., straight line from the point at $V_{min}$ to $V_{nom}$, and from $V_{nom}$ to the point at $V_{max}$).

Additionally, in some embodiments, multi-sided variation program 200 calculates a statistical maximum by projecting the inputs of a timing path of integrated circuit design 114 to each process corner of the multi-sided variation to improve accuracy. A process corner is a design of experiments (DoE) technique that refers to a variation of fabrication parameters used in applying an integrated circuit design (e.g., integrated circuit design 114) to a semiconductor wafer. The process corners represent extremes of fabrication parameter variations within which a circuit etched onto a wafer must function correctly, although the circuit may run slower or faster than specified, and at lower or higher temperatures and voltages. Through calculation of the statistical maximums, multi-sided variation program 200 creates canonical forms at each corner for which multi-sided variation program 200 performs calculations. Multi-sided variation program 200 merges the resulting canonical forms of the calculated statistical maximum for each corner in order to calculate a total statistical maximum, which improves the accuracy of the maximum function for multi-sides variables. To merge the statistical maximums at the corners, multi-sided variation program 200 averages the mean of the multi-sided variations, averages the sensitivities of the single sided static variables, and copies the calculated sensitivities of the multi-sided variations. Multi-sided variation program 200 combines the averaged mean, the averages single sided sensitivities, and the copied calculated sensitivities of the multi-sided variation into a single equation to determine the statistical maximum. In some embodiments to further improve accuracy, multi-sided variation program 200 additionally adjusts the sensitivities of the multi-sided variations to model the mean at process corners for the statistical maximum.

For example a logic gate includes two separate inputs and one output. The arrival time of inputs to the logic gate are denoted as $T_1$ and $T_2$. $T_1$ is equal to $a_{1,0}+a_{1,V1}\Delta V_1+a_{1,V2}\Delta V_2+a_{1,T}\Delta T$ and $T_2$ is equal to $a_{2,0}+a_{2,V1}\Delta V_1+a_{2,V2}\Delta V_2+a_{2,T}\Delta T$. Additionally, T1 and T2 include multi-sided variations, in that the canonical forms include a positive and negative variation, which are mutually exclusive. Multi-sided variation program 200 projects multi-sided variables T1 and T2. For T1, multi-sided variation program 200 projects the negative variation of T1 to be $a_{1,0}+a_{1,V1}\Delta V_1+a_{1,V2}\Delta V_2+a_{1,T}\Delta T$ and the positive variation of T1 to be $a_{1,0}+a_{1,V2}\Delta V_2+a_{1,T}\Delta T$. For T2, multi-sided variation program 200 projects the negative variation of T2 to be $a_{2,0}+a_{2,V1}\Delta V_1+a_{2,V2}\Delta V_2+a_{2,T}\Delta T$ and the positive variation of T2 to be $a_{2,0}+a_{2,V2}\Delta V_2+a_{2,T}\Delta T$. Multi-sided variation program 200 combines the negative variation of T1 with the negative variation of T2, and also combines the positive variations of T1 with the positive variation of T2 in order to create a maximum for the negative variation and a maximum variation for the positive variation. The negative variation of $T_{max}$ is $a_{0,V1}+a_{V1}\Delta V_1+a_{T,V1}\Delta T$. The positive variation of $T_{max}$ is $a_{0,V2}+a_{V12}\Delta V_2+a_{T,V2}\Delta T$. To determine the statistical maximum, multi-sided variation program 200 merges the negative variation of $T_{max}$ and the positive variation of $T_{max}$ as follows. Multi-sided variation program 200 averages the mean as $a_0=(a_{0,V2}+a_{0,V1})/2$. Multi-sided variation program 200 averages the sensitivities of the single sided variables as $a_T=(a_{T,V1}+a_{T,V2})/2$. Multi-sided variation program 200 copies the sensitivities of the multi-sided (e.g., two sides) variables to be $a_{V1}\Delta V_1$ and $a_{V2}\Delta V_2$. Multi-sided variation program 200 determines the resultant maximum of the two inputs to be $T=a_{0+}\hat{a}_{V1}\Delta V_1+\hat{a}_{V2}\Delta V_2+a_T\Delta T$. In some embodiments, multi-sided variation program 200 adjusts the model by calculating the mean at the corners as $\hat{a}_{V2}=a_{V2}+(a_{0,V2}-a_{0,V1})/\Delta V_{2,max}$.

In some embodiment, multi-sided variation program 200 utilizes finite differencing schemes to calculate sensitivities. Different finite differencing schemes result in the calculation of different high and low accuracy corners. Multi-sided variation program 200 constructs the finite differencing scheme based on the number of variables and the number of sensitivities. Multi-sided variation program 200 selects the sensitivities of the separate corners and the one base corner to cover the number of variation dimensions (e.g., cover the full voltage range or silicon process space). Multi-sided variation program 200 identifies cross terms between multi-sided variables and single sided variables in which the sensitivities correspond to the positive and negative variations of the multi-sided variables. Cross terms result in response to the sensitivity of a source of variation changing while another source of variation changes. For example, the sensitivity of a temperature changes while transitioning from a high temperature to a low temperature, will be different as a voltage changes from a high voltage to a low voltage. The resulting included cross terms are the equivalent of second order terms in a Taylor series expansion. Through the SSTA engine, multi-sided variation program 200 considers the cross terms with an extended canonical model. Multi-sided variation program 200 constructs a tree on the corners that includes high accuracy corners and low accuracy corners. Multi-sided variation program 200 assigns tree node that correspond to accurately modeled corners (e.g., higher accuracy). Multi-sided variation program 200 assigns an orientation to the tree edges that connects the base corner to the high accuracy corners. Multi-sided variation program 200 considers cross terms when computing sensitivities and modeling in canonical form.

In one embodiment, multi-sided variation program 200 utilizes a star-type scheme, in which a single base corner represents both voltage (V) and process (P) variations. For example FIG. 5, depicts star-type scheme 500. Base corner 502 represents both the V and P variation (e.g., center of the rectangle), in which V and P each include multi-sided variations. Multi-sided variation program 200 projects from the interior base corner to the positive and negative variations of V and P to identify the high accuracy corners (e.g., H 504, H 506, H 508, and H 510). Multi-sided variation program 200 also calculates the worst case positive and negative variations for each combination of V and P (i.e., negative variation of both V and P, positive variation of both V and P, negative variation of V and positive variation of P, and positive variation of V and negative variation of P) to identify the accuracy corners (L 512, L 514, L 516, and L 518). In another embodiment, multi-sided variation program 200 utilizes a Z-type scheme with a single base corner to represent voltage, and two separate corners to represent process variations such as depicted in FIG. 4, which is described in more detail below.

In step 212, multi-sided variation program 200 projects to corners of interest. The projection is an exact calculation with respect to the process point and the delay from timing models 116. In one embodiment, multi-sided variation program 200 projects to corners by utilizing a statistical timer to propagate each of the "r" regions based on the most relevant model. Multi-sided variation program 200 propagates a process space/voltage space based on projections of V and P, for example. Multi-sided variation program 200 utilizes the timing delay identified within the "r" regions that correspond to process and voltage points. Each region includes a sensitivity of the points that are combined into separate canonicals, thereby minimizing a propagation error in a SSTA timing run. For example, multi-sided variation program 200 identifies the individual voltage and process points within each region. Multi-sided variation program 200 propagates canonicals to represent all region sensitivities at the same time. Multi-sided variation program 200 evaluates the sets of canonicals as a group. The voltage and process points include independent terms within the same region that provide different views into the same data. Multi-sided variation program 200 maintains separation (e.g., sensitivity value that is linear) between the endpoints for each region. Multi-sided variation program 200 enables future accurate navigation to an alternate point, with respect to an interior point, via separation measurements associated with the separate voltage and process points.

Figure 4:
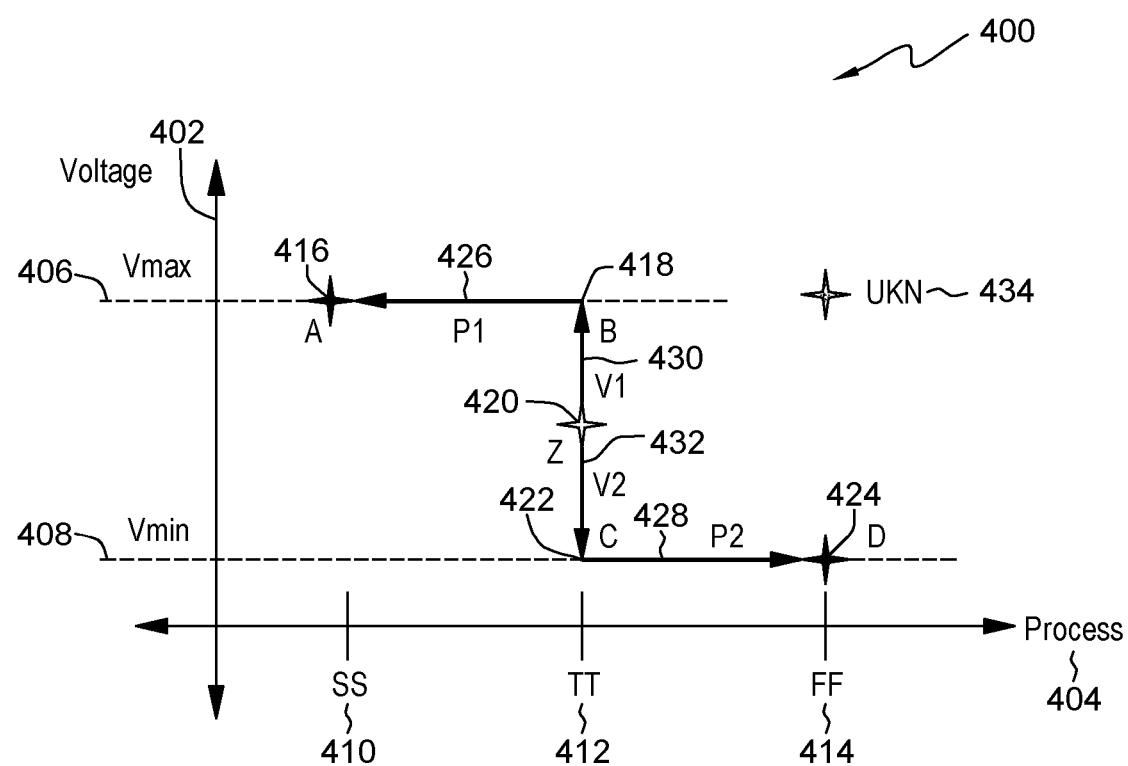
FIG. 4 is a an example of a multi-sided variation within an voltage/process space, in accordance with an embodiment of the present invention.
Figure 5:
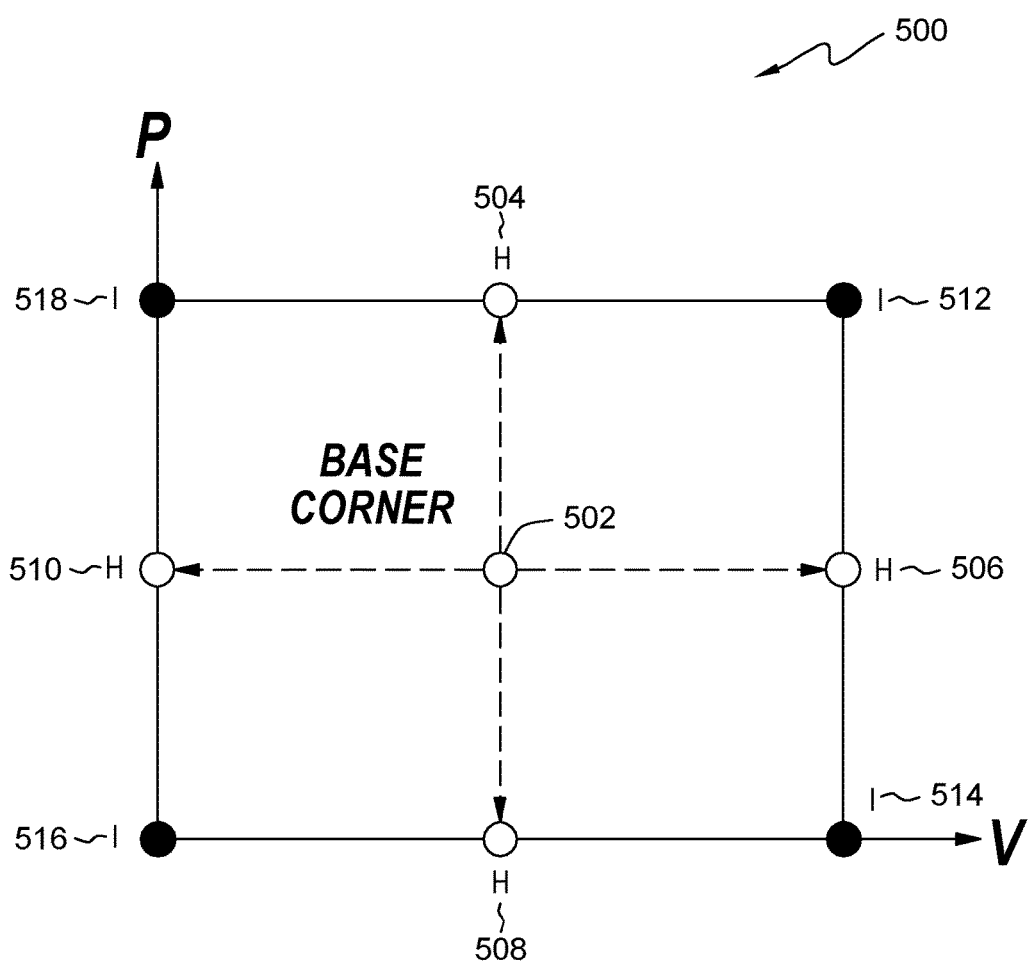
FIG. 5 is a an example of a finite differencing star scheme, in accordance with an embodiment of the present invention.

For example, as depicted in FIG. 4, process/voltage space 400. The y-axis represents Voltage 402 which ranges between $V_{max}$ 406 and $V_{min}$ 408. The x-axis represents Process 404, which includes process corners for slow-slow (e.g., SS 410), typical-typical (e.g., TT 412), and fast-fast (e.g., FF 414). A 416, B 418, Z 420, C 422, and D 424, are process voltage points. Z 420 is a starting corner (i.e., interior point) and multi-sided variation program 200 calculates multi-sided variations in order to project from Z 420 to A 416, B 418, C 422, and D 424. The process/voltage points connect to Z 420 (i.e., starting corner) as follows: A 416 connects to Z 420 by combining $P_1$ 426 and $V_1$ 430 (i.e., A 416 connects to B 418 by P1 426), B 418 connects to Z 420 via $V_1$ 430, C 422 connects to Z 420 via $V_2$ 432, and D 424 connects to Z 420 by combining $V_2$ 432 and $P_2$ 428. The address of each point of interest and a corresponding sensitivity between the point of interest and the process corner is known; and therefore, allows for accurate navigation between endpoints directly from a first point of interest to a second point of interest with high accuracy.

In another embodiment, multi-sided variation program 200 projects the location associated with an unknown corner. Continuing the example, multi-sided variation program 200 receives a request for the location of an unknown corner (e.g., UNK 434) within process/voltage space 400 with $V_{max}$ and FF parameter values. In one embodiment, multi-sided variation program 200 projects to UNK 434 by projecting from Z 420 to B 418 by utilizing V1 430. Multi-sided variation program 200 then utilizes the known value of P1 426 between B 418 and A 416, but uses the inverse (i.e., mirrors the value of P1 in the opposite direction), and projects outward toward the FF condition to estimate a location of UNK 434. In another embodiment, multi-sided variation program 200 projects to UNK 434 by projecting from Z 420 to C 422 by utilizing $V_2$ 432, then to D 424 by utilizing P2 428, and then to UNK 434 by utilizing the inverse of $V_2$ 432 in addition to $V_1$ 430.

In another embodiment, multi-sided variation program 200 projects to the corners of interest by utilizing the statistical timer to propagate each of the "r" regions by combining models based on timing filters. Timing filters provide a means of reducing memory/and runtime of the analysis of integrated circuit design 114 by multi-sided variation program 200. Multi-sided variation program 200 utilizes the timing filters to eliminate sensitivities that are of a very small value (e.g., negligible). Thereby, multi-sided variation program 200 creates a sparse canonical model, as memory placeholders for a marginally small sensitivity that is no longer included. In some other embodiment, multi-sided variation program 200 projects to corners by utilizing the statistical timer to propagate each of the "r" regions by performing multiple statistical runs that cover different "r" regions.

In step 214, multi-sided variation program 200 generates report 118. Within report 118, multi-sided variation program 200 provides timing quantities that project to a specified parameter space. Multi-sided variation program 200 creates and/or provides report 118 to a user at the completion of the analysis for immediate viewing (e.g., onscreen report detailing results for immediate use) and/or storing as an output file that is accessible for future viewing, e-mail, printing, export, etc. by the user. Report 118 identifies the largest variations within integrated circuit design 114 for modification (e.g., fix the design of integrated circuit design 114) without performing additional timing corners (e.g., does not perform separate analysis runs). In one embodiment, multi-sided variation program 200 provides report 118 that includes a detailed analysis of integrated circuit design 114 and provides results pertaining to timing closure for a multi-parameter space with respect to the "r" regions. In another embodiment, multi-sided variation program 200 provides report 118 with graphs for interpretation by users. For example, a user views the graph as depicted in FIG. 4, in which multi-sided variation program 200 projects to corners A 416, B 418, C 422, and D 424. The user views the graph and identifies the largest variations based on the projections. The user identifies areas within integrated circuit design 114 that correspond to the large variations, which the user may then incorporate modifications to improve integrated circuit design 114. In some other embodiments, multi-sided variation program 200 report 118 includes information pertaining to the critical path, arrival time, required arrival time, slack, verification of proper circuit performance of integrated circuit design 114, and identification of problem areas (e.g., failures, non-compliance, etc.) and areas for improvement within integrated circuit design 114.

In some embodiments, within report 118, multi-sided variation program 200 includes a determination as to a validity of integrated circuit design 114 based on an analysis of one or more of the aforementioned embodiments. If multi-sided variation program 200 determines integrated circuit design 114 is valid (i.e., integrated circuit design 114 does not include violations to performance within the timing closure), then multi-sided variation program 200 indicates integrated circuit design 114 may be utilized to manufacture a VLSI chip within report 118. If multi-sided variation program 200 determines integrated circuit design 114 is not valid (i.e., integrated circuit design 114 includes violations to performance within the timing closure), multi-sided variation program 200 identifies the largest variations based on the projections within report 118 for the user to review. Upon review of report 118, the user may incorporate modifications to integrated circuit design 114. After incorporating modifications to integrated circuit design 114, the user may also initiate another instance of multi-sided variation program 200 to validate the modifications prior to manufacturing the VLSI chip. In an embodiment, multi-sided variation program 200 includes one or more of the aforementioned embodiments within report 118 for further utilization by a user. Multi-sided variation program 200 completes after providing report 118.

Figure 6:
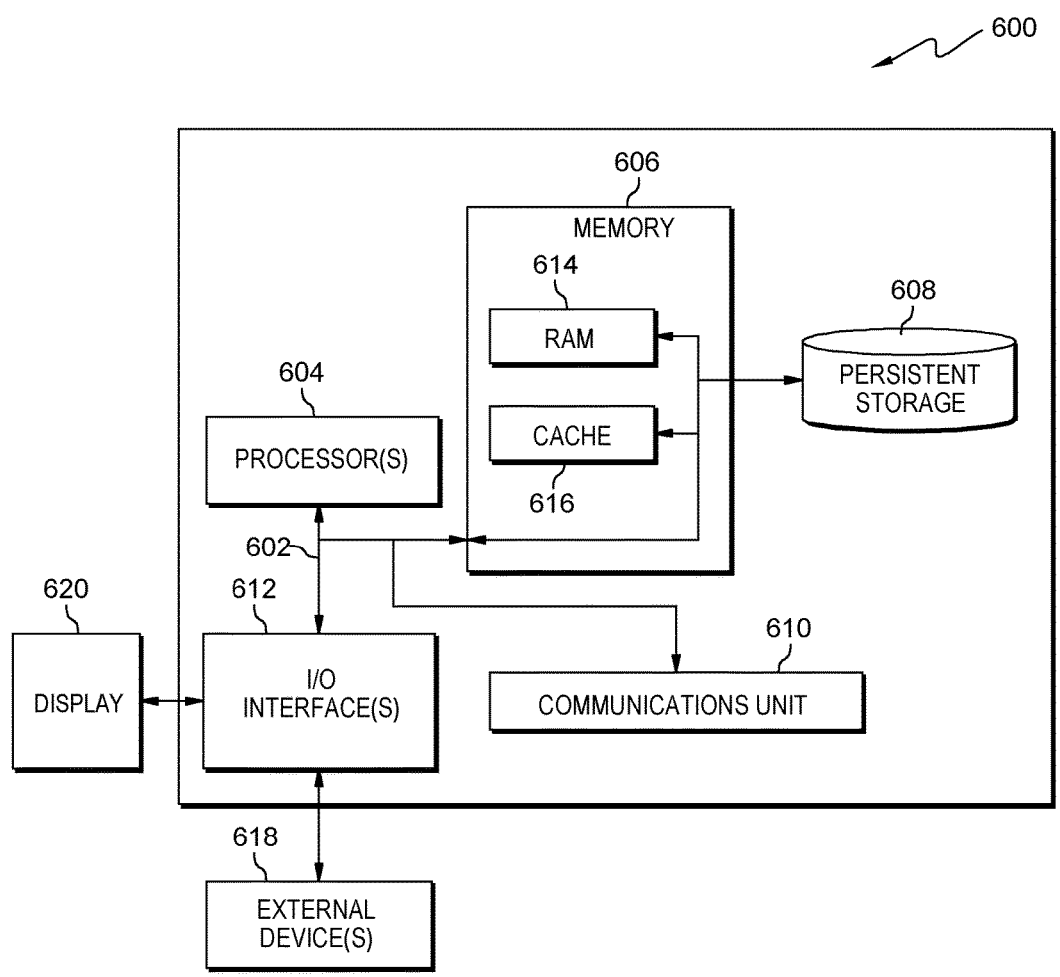
FIG. 6 is a block diagram of components of the computer device executing the multi-sided variation program, in accordance with an embodiment of the present invention.

FIG. 6 depicts a block diagram of components of computing device 600 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM) 614. In general, memory 606 can include any suitable volatile or non-volatile computer readable storage media. Cache 616 is a fast memory that enhances the performance of computer processor(s) 604 by holding recently accessed data, and data near accessed data, from memory 606.

User interface 112, integrated circuit design 114, timing models 116, report 118, and multi-sided variation program 200 may be stored in persistent storage 608 and in memory 606 for execution and/or access by one or more of the respective computer processor(s) 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. User interface 112, integrated circuit design 114, timing models 116, report 118, and multi-sided variation program 200 may be downloaded to persistent storage 608 through communications unit 610.

I/O interface(s) 612 allows for input and output of data with other devices that may be connected to computing device 600. For example, I/O interface(s) 612 may provide a connection to external device(s) 618, such as a keyboard, a keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., user interface 112, integrated circuit design 114, timing models 116, report 118, and multi-sided variation program 200, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating an integrated circuit with non-linear variations, the method comprising:

identifying, by one or more computer processors, an integrated circuit design;

identifying, by one or more computer processors, a timing model associated with the identified integrated circuit design;

defining, by one or more computer processors, one or more static single sided variables;

defining, by one or more computer processors, one or more regions of one or more of the defined one or more static single sided variables that are treated linearly;

defining, by one or more computer processors, one or more multi-sided variables based on the defined one or more regions of the defined one or more static single sided variables, wherein the one or more multi-sided variables are parameters in which a canonical form includes a positive variation term and a negative variation term that are mutually exclusive, wherein the defining one or more regions of the defined one or more static single sided variables that are treated linearly further comprises:
- identifying, by one or more computer processors, a non-linearity within a parameter space associated with the identified integrated circuit design; and
- dividing, by one or more computer processors, the identified non-linearity into one or more regions, wherein each of the divided one or more regions identifies a linear space within the parameter space;

identifying, by one or more computer processors, one or more timing paths within the identified integrated circuit design;

performing, by one or more computer processors, a statistical static timing analysis on the identified timing model for the identified one or more timing paths within the identified integrated circuit design utilizing the defined one or more multi-sided variables, wherein the performing the statistical static timing analysis on the identified timing model for the identified one or more timing paths within the identified integrated circuit design utilizing the defined one or more multi-sided variables further comprises:
- calculating, by one or more computer processors, one or more sensitivities based on the one or more regions for each of the identified one or more timing paths utilizing the defined one or more multi-sided variables;
- identifying, by one or more computer processors, one or more delays with respect to the identified one or more timing paths within the identified integrated circuit design for the defined one or more multi-sided variables from within the identified timing model that identifies the one or more delays via a look-up table by a gate type and a slew/load process, voltage, temperature (PVT) condition; and
- generating, by one or more computer processors, canonical forms of the defined one or more multi-sided variables based on the identified one or more delays and the calculated one or more sensitivities, wherein the canonical forms represent timing quantities that include a mean value and one or more sensitivities to a source of variation;

providing, by one or more computer processors, one or more timing quantities that project within a multi-parameter space based on the performed statistical static timing analysis;

calculating, by one or more computer processors, a variation associated with each multi-sided variable of the defined one or more multi-sided variables within each divided region of the divided one or more regions;

propagating, by one or more computer processors, each multi-sided variable of the defined one or more multi-sided variables based on the calculated variation;

performing, by one or more computer processors, a maximum operation on the calculated variation of each of the defined one or more multi-sided variables;

performing, by one or more computer processors, minimum operations on the calculated variation of each of the defined one or more multi-sided variables;

projecting, by one or more computer processors, to a corner space based on a combination of one or more of: the performed maximum operation and the performed minimum operations;

projecting, by one or more computer processors, the identified one or more timing paths to each process corner;

creating, by one or more computer processors, a canonical form for the projected one or more timing paths to each process corner;

merging, by one or more computer processors, the created canonical forms to calculate a statistical maximum;

adjusting, by one or more computer processors, a sensitivity associated with the defined one or more multi-sided variables based on the calculated statistical maximum;

utilizing, by one or more computer processors, a finite differencing scheme to calculate one or more cross terms;

performing, by one or more computer processors, a statistical static timing analysis on the identified timing model associated with the identified integrated circuit design utilizing remaining single-sided variables that are not transformed to multi-sided variables;

determining, by one or more computer processors, whether the identified integrated circuit design is valid, based on the provided one or more timing quantities; and responsive to determining the identified integrated circuit design is valid, providing, by one or more computer processors, an indication to create an integrated circuit based on the identified integrated circuit design.

* * * * *